United States Patent [19]

Hardage

[11] Patent Number: 5,144,591
[45] Date of Patent: Sep. 1, 1992

[54] METHOD FOR DETERMINING GEOMETRY OF SUBSURFACE FEATURES WHILE DRILLING

[75] Inventor: Bob A. Hardage, Austin, Tex.

[73] Assignee: Western Atlas International, Inc., Houston, Tex.

[21] Appl. No.: 636,757

[22] Filed: Jan. 2, 1991

[51] Int. Cl.$^5$ .................... G01V 1/40; H04L 3/18
[52] U.S. Cl. ...................... 367/75; 367/31; 181/106; 175/40
[58] Field of Search .............. 367/25, 131, 56, 57, 367/75, 912; 181/106; 175/39, 40, 50

[56] References Cited

U.S. PATENT DOCUMENTS

| | | | |
|---|---|---|---|
| 3,881,168 | 4/1975 | Farr et al. | 340/15.5 BH |
| 3,886,495 | 5/1975 | Sexton et al. | 340/18 LD |
| 3,993,974 | 11/1976 | Silverman et al. | 340/15.5 MC |
| 4,144,949 | 3/1979 | Silverman | 181/106 |
| 4,207,619 | 6/1980 | Klaveness | 367/36 |
| 4,252,209 | 2/1981 | Silverman | 181/106 |
| 4,363,112 | 12/1982 | Widrow | 367/30 |
| 4,365,322 | 12/1982 | Widrow | 367/32 |
| 4,460,059 | 7/1984 | Katz | 181/102 |
| 4,474,250 | 10/1984 | Dardick | 175/1 |
| 4,556,962 | 12/1985 | Widrow | 367/45 |
| 4,718,048 | 1/1988 | Staron et al. | 367/40 |
| 4,817,061 | 3/1989 | Alford et al. | 347/75 |
| 4,829,489 | 5/1989 | Rector | 367/82 |
| 4,849,945 | 7/1989 | Widrow | 367/30 |
| 4,862,423 | 8/1989 | Rector | 367/25 |
| 4,926,391 | 5/1990 | Rector et al. | 367/41 |
| 4,933,913 | 6/1990 | Thomsen | 367/75 |

OTHER PUBLICATIONS

Winterstein, D. F.; "Velocity Anisotropy Terminology for Geophysicists"; Geophysics, vol. 55, #8, pp. 1070-1088; Aug. 1990.
Daley et al.; "Multiply-Polarized Stem-Ware VS/S . . ."; Geophys. Res. Lett., vol. 15 #9, pp. 1001-1004, Aug. 1988.
Tatban et al.; "A Physical Model . . . Fracture Intensity"; Explogeophys (Australia), vol. 19, #1-2, pp. 175-178, Jun. 1988.
Li, Y. G., "Seismic Wave . . . Fractures in the Earth"; PhD Thesis, 1988, Diss. Abst. Int., Sec. B, v-50, #2, p. 409-B.
Crampin, Stuart et al., Mar. 1980, "Estimating Crack Parameters from Observations of P-Wave Velocity Anisotropy", Geophysics, vol. 45, No. 3, pp. 345-360.
Crampin, Stuart, "Evaluation of Anisotropy by Shear-Wave Splitting", Geophysics, vol. 50, No. 1 (Jan. 1985), pp. 142-152.
Devaney, A. J. et al., "A Plane-Wave Decomposition for Elastic Wave Fields Applied to the Separation of P-Waves and S-Waves in Vector Seismic Data", Geophysics, vol. 51, No. 2 (Feb. 1986), pp. 419-423.
Abraham, Kurt S. et al., "Offshore Technology Emphasis is on Subsea Completions", World Oil (Jul. 1989), pp. 37-44.

(List continued on next page.)

Primary Examiner—Nelson Moskowitz
Attorney, Agent, or Firm—E. Eugene Thigpen

[57] ABSTRACT

A method for detecting the presences of fractures in a subsurface formation being penetrated by a drill bit during drilling. Teeth on the drill bit act as individual seismic sources, generating both shear wave energy and compressional wave energy. As the drill bit passes through a formation, the shear wave energy generated by the bit propagates along the formation in a waveguide mode between the adjacent formations. As the shear wave signal passes through a fractured zone of the formation, two shear wave signals are generated, each polarized in relationship to the orientation of the fractures in the formation. As the polarized signals propagate along the formation, secondary shear wave signals are generated which return to the surface and are detected by appropriate sensors. The sensors have a plurality of detectors in order to detect the polarity or direction of particle motion cuased by the polarized wave, providing information that a fracture zone exists in the subsurface.

3 Claims, 9 Drawing Sheets

OTHER PUBLICATIONS

Rector, James W. III et al., "Extending VSP to 3-D and MWD: Using the Drill Bit as Downhole Seismic Source", Oil & Gas Journal (Jun. 19, 1989), pp. 55–58.

Rector, J. W. III, et al., "MWD VSP and Checkshot Surveys Using the Drill Bit as a Downhole Energy Source", OTC 6024 (Offshore Technology Conference, Copyright 1989, Presented ath the 21st Annual OTC in Houston, Texas, May 1–4, 1989, pp. 497–506.

Crampin et al., "The Variation of Delays in Stress-Induced Anisotropic Polarization Anomalies", Geophys. J.R. astr. Soc. (1981) 64, 115–131.

Booth et al., "The Anisotropic Reflectivity Technique: Anomalous Reflected Arrivals from an Anisotropic Upper Mantle", Geophys. J.R. astr. Soc. (1983) 72, 767–782.

Booth et al., "The Anisotropic Reflectivity Technique: Theory", Geophys. J.R. astr. Soc (1983) 72, 755–766.

Crampin, "Anisotropy in Exploration Seismics", First Break, Mar. 1984, 19–21.

Crampin, "Evidence for Aligned Cracks in the Earth's Crust", First Break, vol. 3, No. 3, 1985, pp. 12–15.

Crampin, "Seismic-Wave Propagation Through a Cracked Solid: Polarization as a Possible Dilatancy Diagnostic", Geophys. J.R. astr. Soc. (1978) 53, pp. 467–496.

$$U_\theta = -\frac{Gd\sin\phi}{4\pi\rho\beta^3 r} g'(t-r/\beta)$$
$$U_r = 0$$
$$U_\phi = 0$$

$V_2 >> V_1$
$V_2 >> V_3$

METHOD FOR DETERMINING GEOMETRY OF SUBSURFACE FEATURES WHILE DRILLING

BACKGROUND OF THE INVENTION

1. Field of the Invention

This invention relates generally to methods for obtaining subsurface geological information in the exploration of petroleum deposits. More particularly, the invention relates to a method for determining geometry of subsurface features while drilling.

2. Discussion of the Related Art

Much of the ultimate success (or failure) of hydrocarbon recovery depends on the assessment, usually implicit, of the internal crack-, pore-, and stress-geometry, and pore fluids of the reservoir rock. It also depends on the estimation of the changes to these quantities as the secondary and tertiary production or enhanced oil recovery (EOR) proceeds. At present, only a small proportion of the oil in a reservoir is recoverable. Numerous techniques have been developed to enhance the recovery of petroleum deposits, almost all of which depend on subsurface information.

Historically, the geological structure of a subsurface region has been determined by arranging seismic detectors on the surface above the region to be explored. A seismic source, also located on or near the surface, is actuated to produce one or more seismic pulses: each pulse propagates downward as an expanding spherical wave front and reflected by acoustic impedance changes in the subsurface. The acoustic impedance changes generally coincide with changes in lithology, structure or both. The reflected wave front arrives at the surface where it is detected by the seismic sensors. The sensors generate signals which are recorded for later processing, display, and interpretation. One disadvantage in the technique is that the seismic signal is altered (filtered and attenuated) by each formation it traverses before being detected. Thus the signal reflects characteristics of all of the formations traversed.

A technique generally known as Vertical Seismic Profiling (VSP) is also used to obtain subsurface information. In VSP, minimum length travel paths of the seismic wave front are detected. In order to conduct a VSP survey a string of seismic detectors are lowered into a bore hole with the seismic source located at the surface. The source is actuated to produce one or more seismic pulses. Each pulse propagates downward as an expanding spherical wave front and is detected by the sensors disposed within the bore hole. Once the signals are detected, the sensors may be moved to another position and the procedure repeated. Alternatively, the source may be located in the bore hole and the sensors disposed along the surface in the desired array. A major disadvantage with VSP is that a bore hole is required. If one is not present, the bore hole must be drilled and the drill string removed before the survey can be conducted. After the survey, the drill string may be reinserted in the bore hole to continue drilling. The "tripping" of the drill string in and out of the bore hole in order to conduct the survey requires a great deal of time and is thus costly.

Another technique very similar to VSP is cross-well tomography. The technique requires two well bores, one for the seismic source and one for the seismic sensors. Both the source and the sensors are positioned at predetermined level and the source is actuated. The seismic signal propagates through the subsurface and is detected by the sensors in the adjacent well. This technique provides critical information on the seismic velocities for the various subsurface intervals. However, this technique suffers the same disadvantages as traditional VSP surveys. It is most effective in regions where the wells have already been drilled.

Other techniques employ down hole seismic sources. Such sources typically make use of an artificial transducer situated at a given depth in the bore hole. Broding et al., U.S. Pat. No. 3,909,776, and U.S. Pat. No. 3,881,168 issued to Farr and Ward use a fluid driven oscillator to generate seismic waves in the earth from a position in the bore hole. Phase delays between a geophone located on the surface near the well and another located near the top of the well are used to produce a log of travel-time and compressional wave velocity as a function of depth. Broding et al. use a fluid driven oscillator which changes emitted frequency as a function of time, much like a swept frequency source such as described in U.S. Pat. No. 2,688,124.

One technique for obtaining subsurface information utilizes the drill bit as a seismic source. One of the earliest patents concerning down hole sources is Weatherby, U.S. Pat. No. 2,062,151, which discloses using the drill bit as an impulse generator. Drilling is done with a cable tool, which is dropped on the hole bottom, thus creating the seismic impulses. The bit location and wave velocity can be obtained from these impulses. Drill-bit-generated direct wave arrival time differences between two geophone locations are used to determine rock acoustic velocity. U.S. Pat Nos. 4,363,112 and 4,365,322 issued to Widrow disclose using the continuous natural, random vibrations of a rotary drill bit to launch seismic waves into the earth. Spectral amplitudes and interference patterns are used to image subsurface reflectors. Advantages in these techniques are that they may be used in the drilling of "wildcat wells", wells that are drilled in frontier regions with unknown geology. However, no art in the field of detecting-while-drilling teaches using shear waves generated by the drill bit to detect fracture zones in a subsurface zone of interest. Moreover, the art in the field of detecting-while-drilling does not teach nor suggest using shear wave energy while drilling horizontally.

It is a general object of this invention to provide a method for obtaining information about subsurface intervals of interest while drilling. It is another object of this invention to provide a method for detecting fracture zones in a formation penetrated by a drill bit. It is yet another object of this invention to provide a method for real-time detection of fracture zones in formations while drilling substantially horizontally or between adjacent stratigraphic units.

SUMMARY OF THE INVENTION

In accordance with one aspect of the invention, a method for obtaining information about a subsurface interval of interest is obtained by generating seismic waves in the interval with the drill bit as the drill bit passes through the interval. In accordance with another aspect of this invention, the method may be conducted while drilling in a traditional vertical or offset bore hole where the drill bit transversely passes through the stratigraphic units. In accordance with yet another object of the invention, the method of determining reservoir geometry may be determined while drilling horizontally or substantially within a stratigraphic unit.

As the drill bit passes through a stratigraphic unit, the bit generates seismic waves, both primary or compressional and shear, which radiate away from the bore hole. The shear waves radiate as an expanding wavefront in a direction generally perpendicular to the axis of the bore hole. Where the velocity of the unit being drilled is greater than the velocity of the adjacent formations, the unit acts as a waveguide. At an upper boundary between the adjacent formation, secondary compressional and shear waves are generated which propagate towards the surface and are detected. As the shear wave in the drilled unit encounters a fracture zone, the shear waves become polarized creating both a first shear wave oriented parallel to the fractures and a second shear wave component with its displacement vector oriented perpendicular to the orientation of the fracture planes. The polarized shear waves also generate secondary waves in the adjacent formation which are detected at the surface. As the shear waves in the objective formation pass though a fracture zone, the orientation of the shear-wave particle displacement vector rotates due to the fracture-induced wave polarization. A corresponding particle displacement change occurs in the secondary shear waves in the adjacent formations. Accordingly, detection of the change in particle displacement at the surface provides the geometry of the fracture zone in the subsurface.

BRIEF DESCRIPTION OF THE DRAWING FIGURES

A better understanding of the benefits and advantages of my invention may be obtained from the appended detailed description and drawing figures, wherein.

Figure 12:
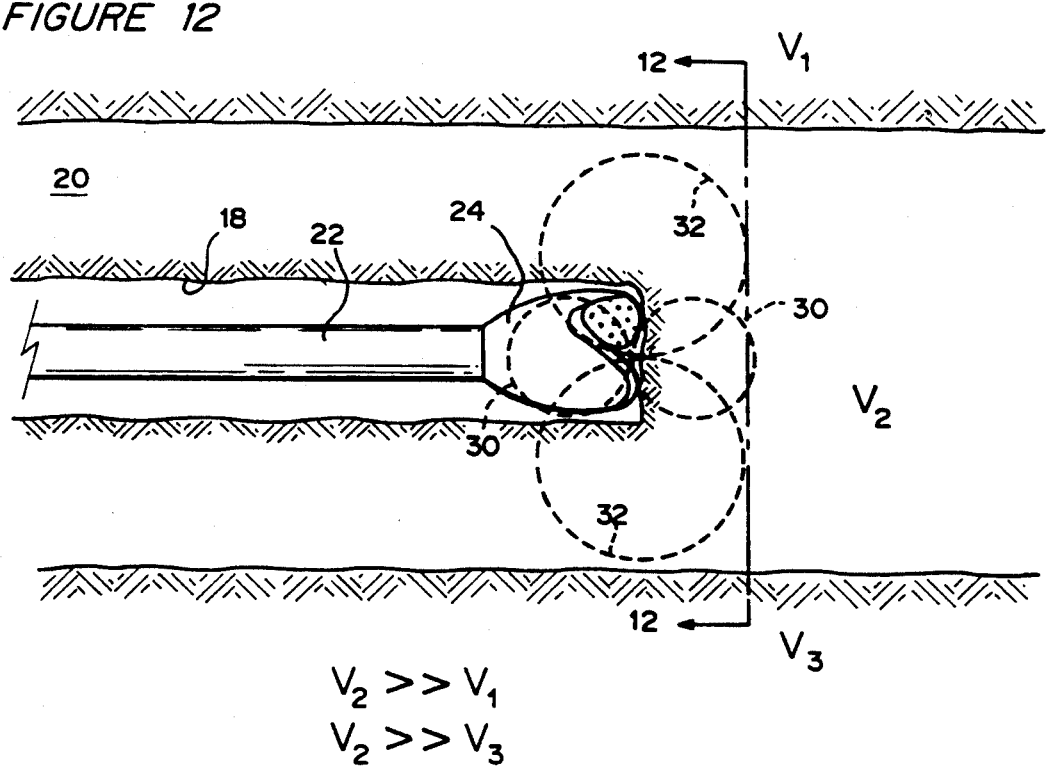
Figure 13:
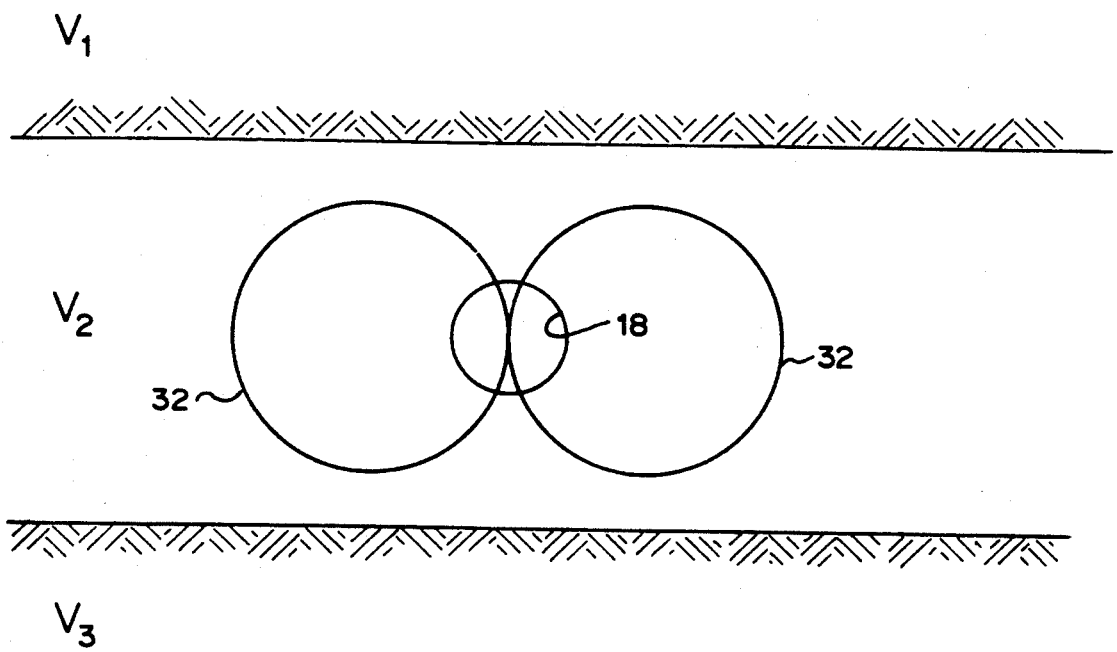

FIG. 12 generally illustrates the drill string and bit in a horizontal drilling configuration; and FIG. 13 illustrate radiation patterns of the seismic waves as viewed along the axis of the drill string/bore hole.

DETAILED DESCRIPTION OF A PREFERRED EMBODIMENT

Figure 1:
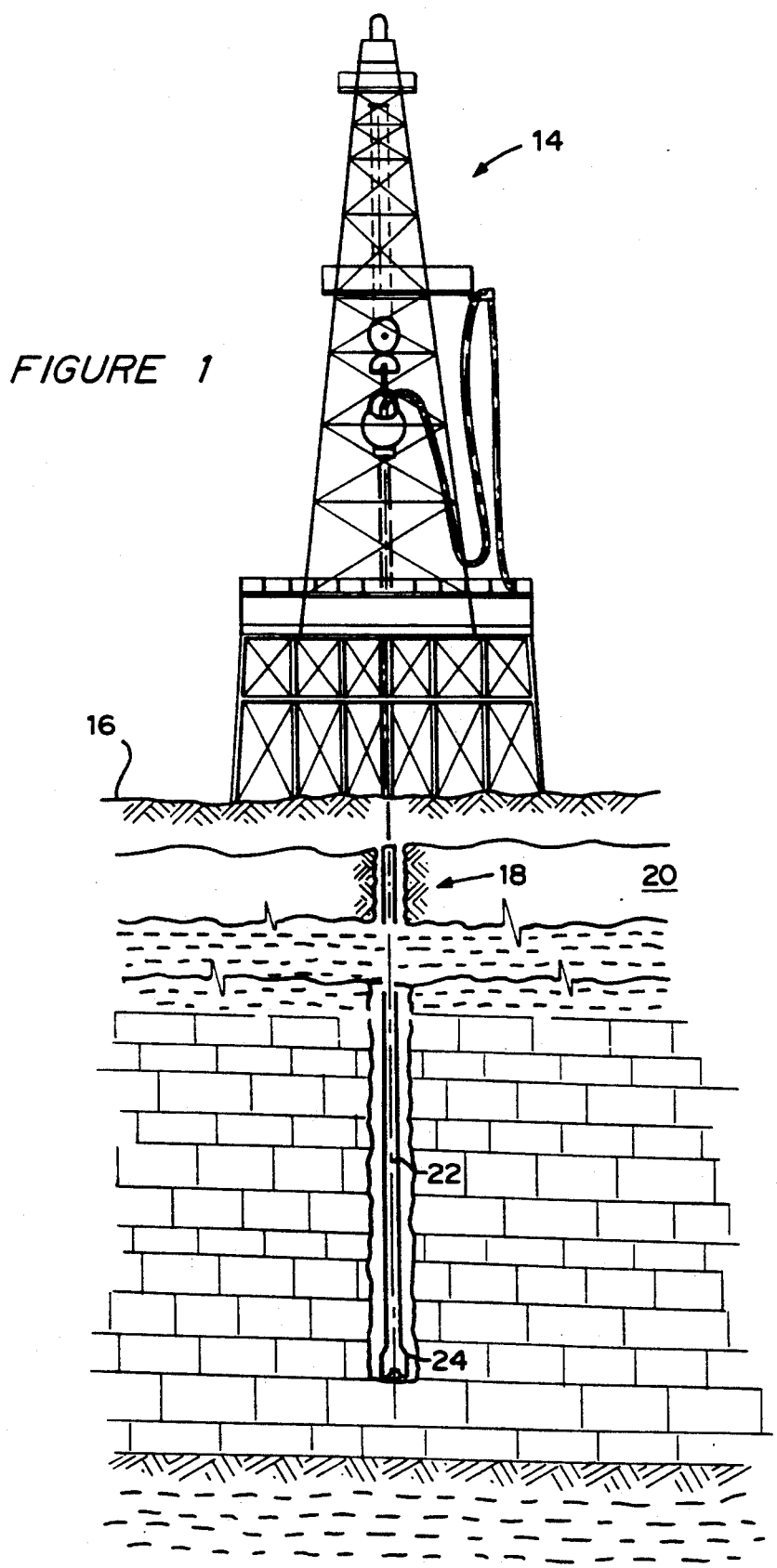
FIG. 1 is a general illustration of a bore hole being drilled in the earth.

FIG. 1 is a general illustration of a bore hole being drilled in the earth. A drill rig, generally indicated by reference 14, has been located on the surface of the earth 16 to drill a well 18 in the subsurface, generally indicated by reference 20. The drill rig 14 supports a drill string 22 having a drill bit 24 at a lower end used to bore through the subsurface units 20. A turn table or top drive (not shown) in the drill rig rotates the drill string causing the drill bit to cut into the subsurface. Cuttings from the bore hole may be removed in a conventional manner using a fluid forced down through the drill string and exiting at the drill bit. The fluid then flows up the bore hole carrying the cuttings to the surface where they are disposed of.

Figure 2:
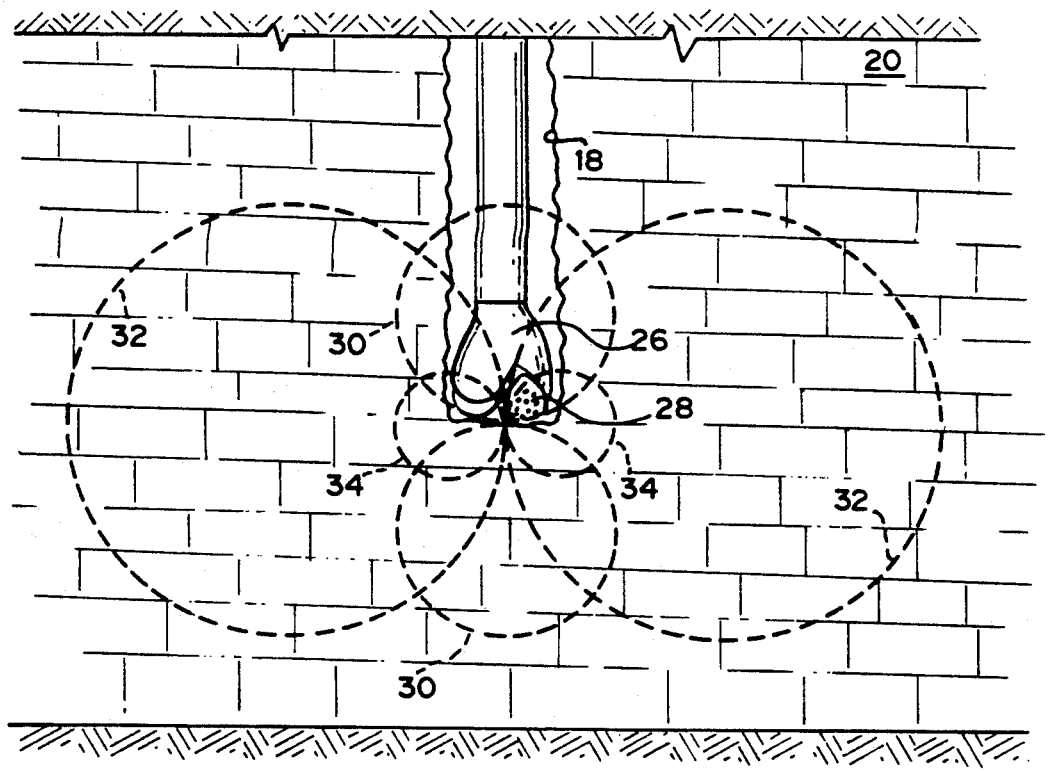
FIG. 2 is a diagram of the seismic radiation patterns generated by a drill bit in a formation.

FIG. 2 is a diagram of a drill bit 26 at the bottom of a well bore 18 and the seismic wavefield radiation patterns generated by the drill bit in a formation. The drill bit illustrated is a tri-cone bit well known in the industry. Each cone 28 rotates and has a plurality of projections or teeth which chip away a portion of the formation as the drill bit is turned. As each tooth contacts the earth a seismic signal is generated. The seismic signal typically consists of a compressional wave, the radiation pattern of which is generally illustrated by reference 30, a SV shear wave, the radiation pattern of which is generally illustrated by reference 32, and a SH shear wave having a radiation pattern indicated by reference 34. The particle motion for each wave is well known in the industry and will not be discussed herein.

Figure 3:
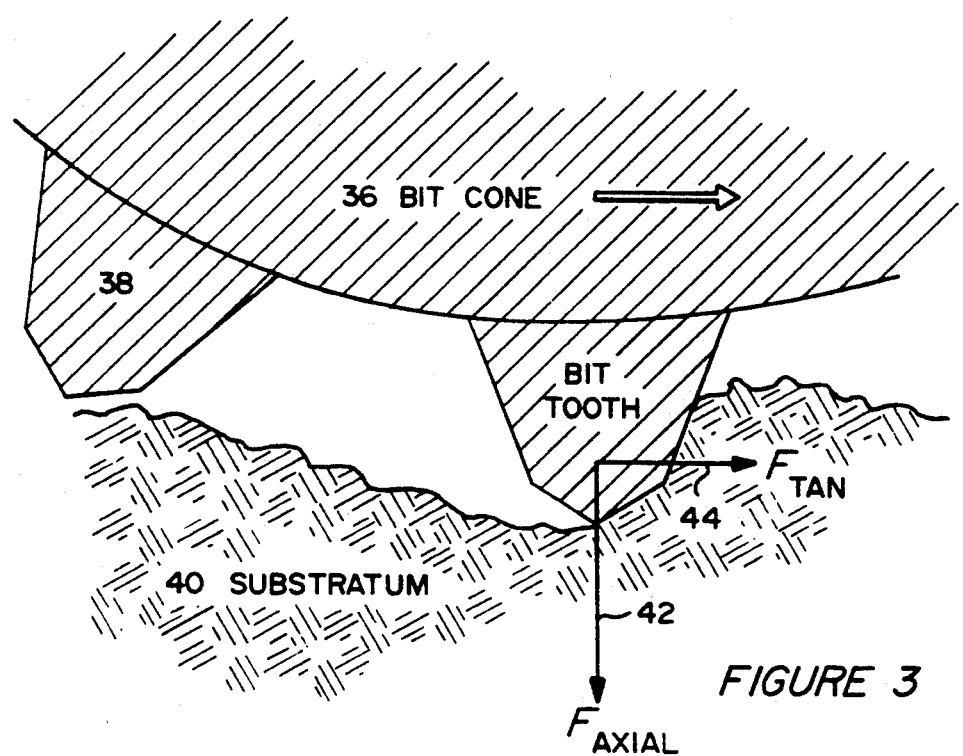
FIG. 3 illustrates the forces generated by the impact of a drill bit tooth.

FIG. 3 illustrates the forces generated by the impact of a drill bit tooth. The Figure is an enlarged image of a portion of one cone 36 having a plurality of teeth 38 thereon. As the cone turns about its axis as the bit is turned, each tooth 38 contacts the substratum 40, and acting like a chisel breaks away a portion of the earth. As each tooth 38 engages the earth, the axial force ($F_{AXIAL}$) generated by each tooth is greater than the tangential force ($F_{TAN}$) as represented by the different lengths of arrows or vectors 42 and 44. However, each tooth does not exert the same force.

Figure 4:
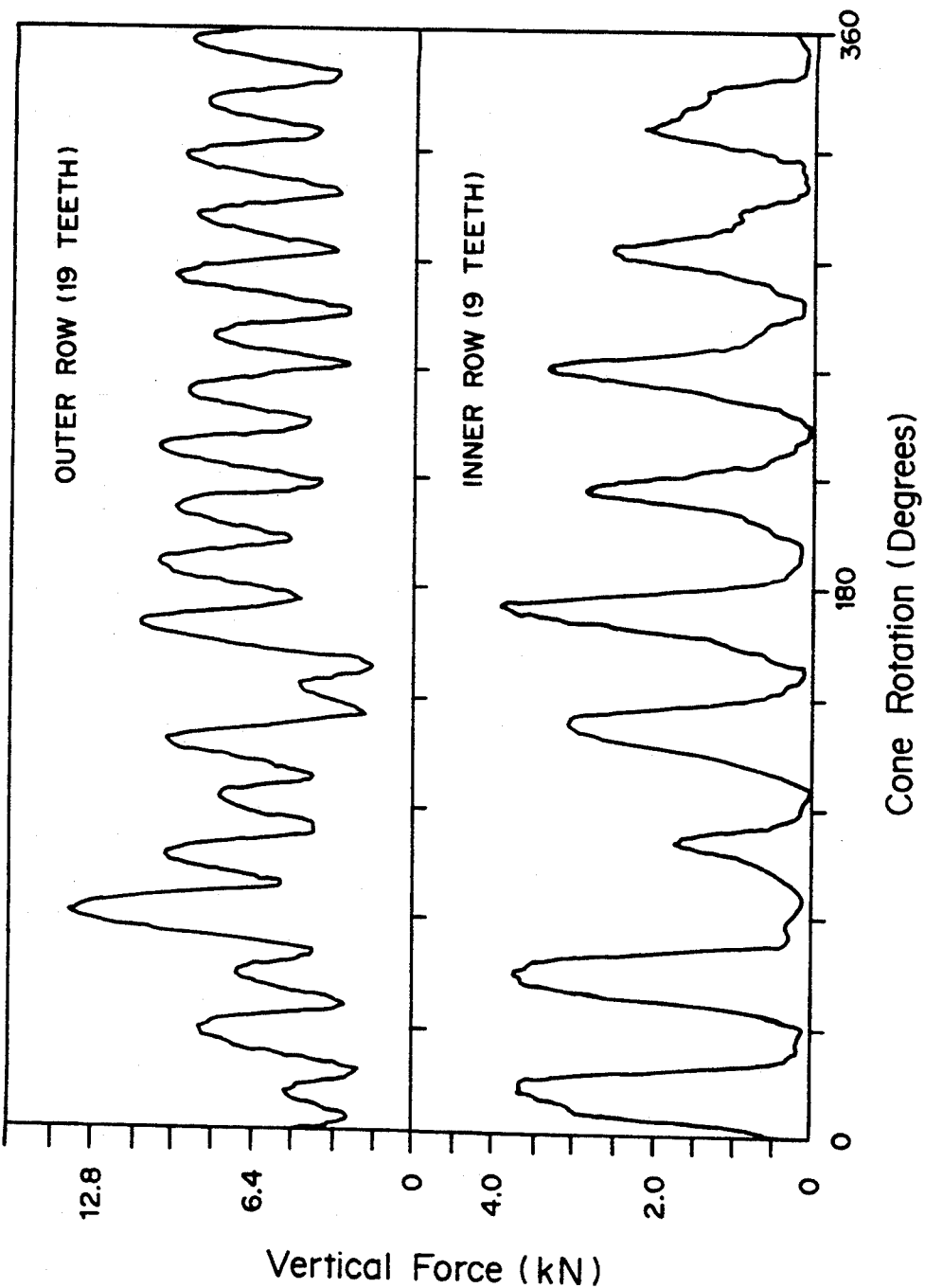
FIG. 4 illustrates the frequency and magnitude of axial forces generated by tooth impacts at different points on a drill bit.
Figure 5:
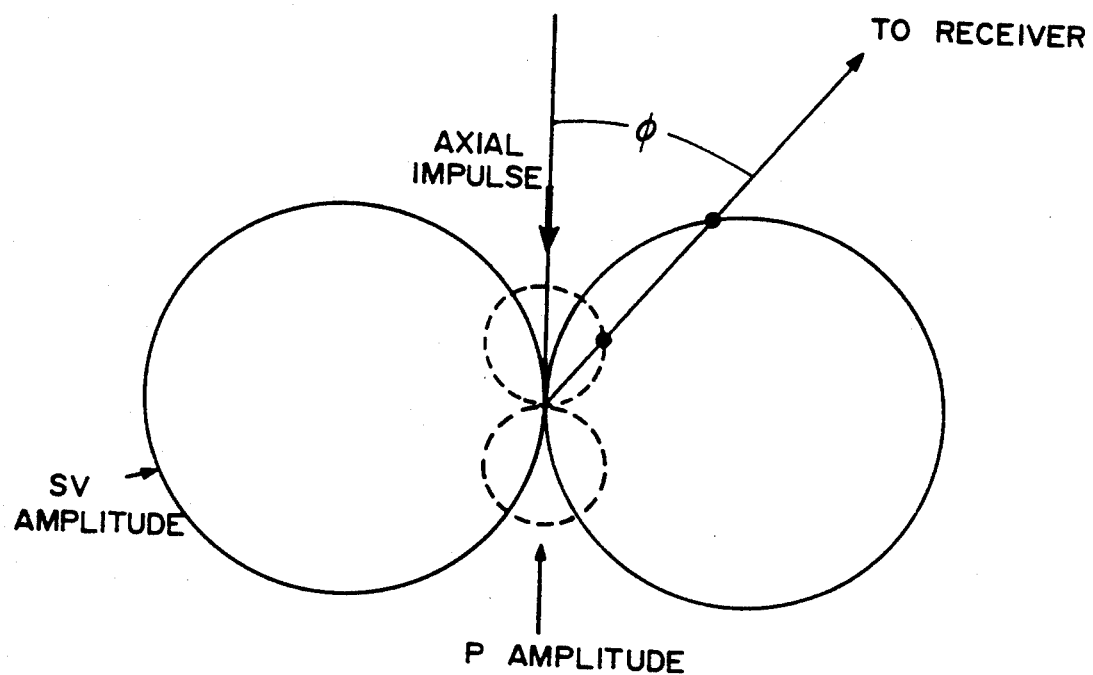
FIG. 5 is another diagram of the seismic radiation patterns generated by the drill bit in the formation.
Figure 6:
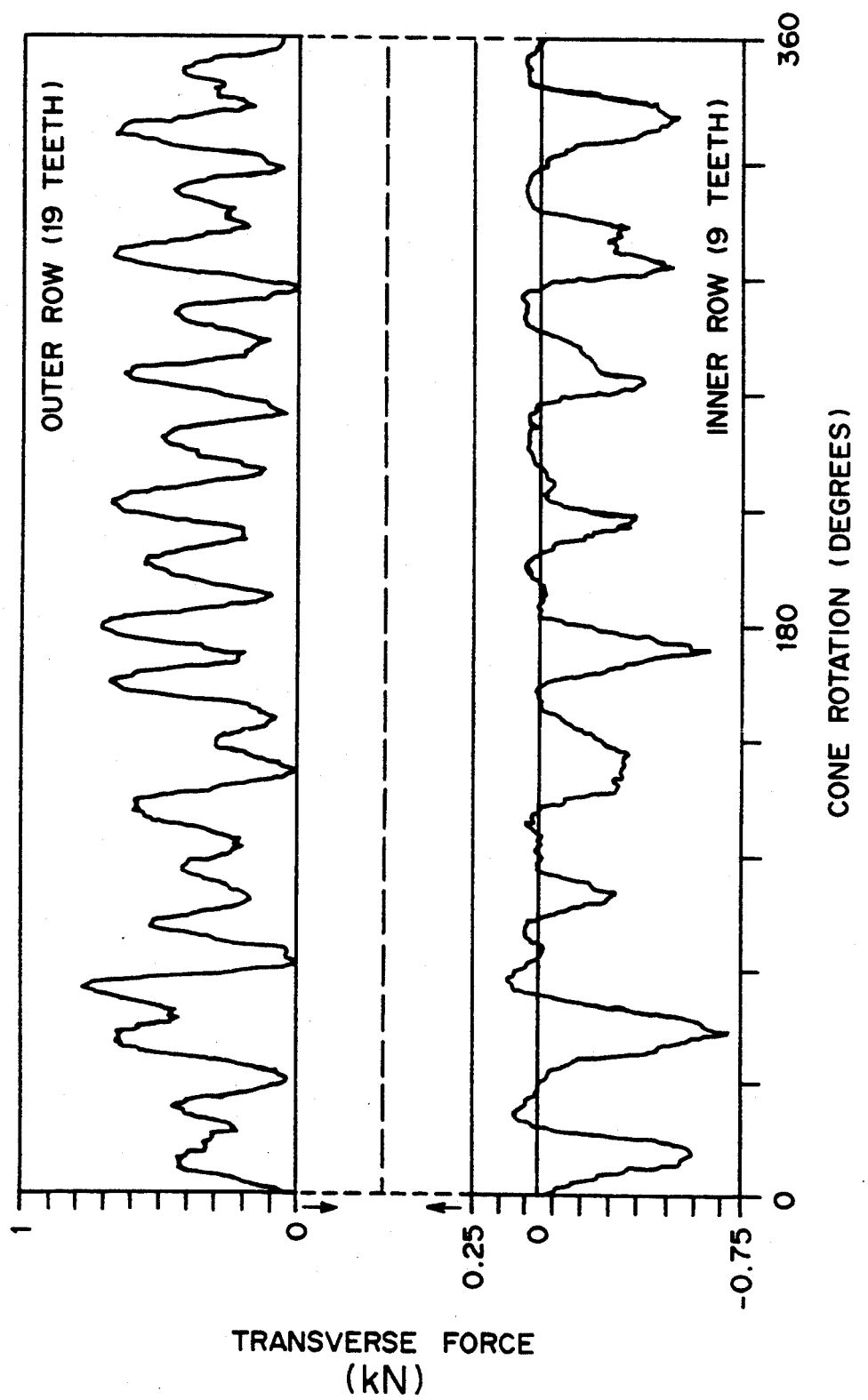
FIG. 6 illustrates the frequency and magnitude of transverse forces generated by tooth impacts at different points on a drill bit.

FIG. 4 illustrates the frequency and magnitude of axial forces generated by tooth impacts at different locations on a drill bit. As is well known in the industry, conical drill bits contain a greater number of teeth around the base of the cone than are contained towards the tip. In the example shown in FIG. 4, only the impacts generated by a single cone were measured. The bit used for the measurements contained nineteen teeth around the cone base, and nine teeth towards the tip of the cone. As the cone was rotated the magnitude of the forces generated by each tooth were measured and plotted as a function of rotation angle. On average the row of teeth around the base generated a greater axial force per tooth than did the teeth near the tip. The axially directed impulse is assumed to create the compressional and SV shear radiation patterns shown in FIG. 5. No SH shear pattern is produced by the axial impulse. The compressional and SV shear patterns may be defined by the following Expression:

$$U_r = A \frac{\cos \phi}{a^2 r} g(t - r/a), \qquad (1)$$

and $$U_\phi = A \frac{\sin \phi}{\beta^2 r} g(t - r/\beta). \quad (2)$$

where
- $\phi$ is the direction of ray propagation from the source;
- is the formation density;
- $\alpha$ is the compressional velocity in the earth;
- $\beta$ is the shear velocity in the earth;
- $r$ is the radial distance to any observation point;
- $g$ is an arbitrary function describing the time behavior impulsive force applied to the bottom of the bore hole;
- $t$ is time;
- $U_r$ is the radial displacement; and
- $U_\phi$ is the particle displacement in the $\phi$ direction In a like fashion, FIG. 6 illustrates the frequency and magnitude of transverse forces generated by the same cone. Again, as in FIG. 4, the teeth at the base generated a greater transverse force than did the teeth near the tip. Moreover, notice that the teeth near the tip generated a negative transverse force, that is a force in opposite polarity to those generated by the teeth at the base. It is this relationship that causes the second SH shear wave to have a smaller wavefield than either the compressional wave or the first SV shear-wave shown in FIG. 2.

Figure 7:
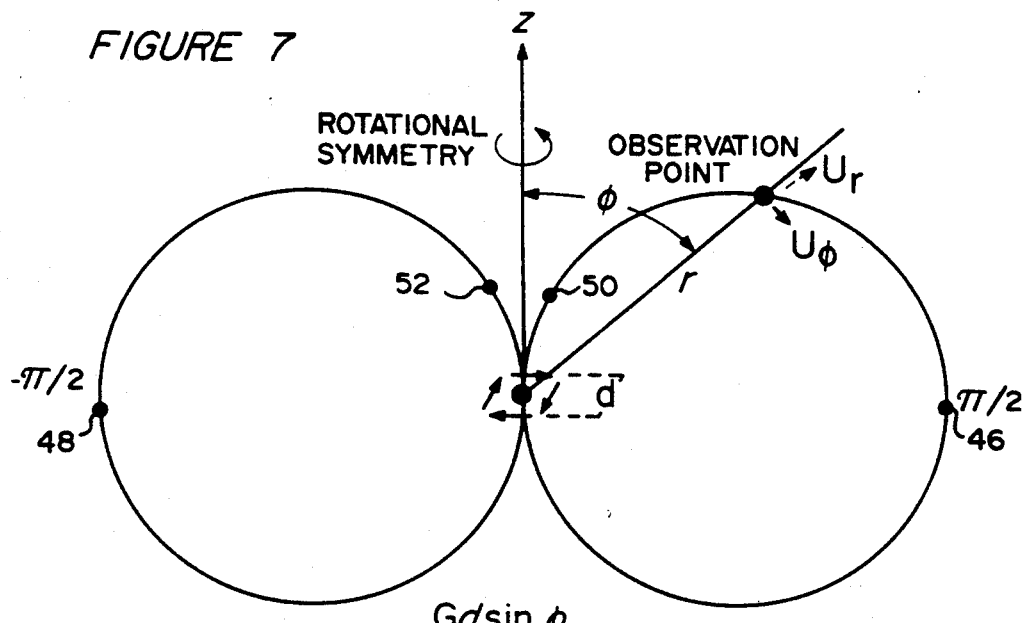
FIG. 7 is a diagram of the SH shear-wave radiation pattern and the expected particle-displacement magnitude as a function of the radial observation point with respect to the source.

FIG. 7 diagrams the SH shear-wave radiation pattern and the expected particle-displacement magnitude as a function of the radial observation point with respect to the source. The vertical axis, z, represents the drill string. The radiation pattern may be defined by Expression (3):

$$U_\theta = -\frac{Gd \sin \phi}{4\pi\rho\beta^3 r} g'(t - r/\beta); \quad (3)$$

$$U_r = 0$$

$$U_\phi = 0,$$

- $G$ is a scaling constant;
- $d$ is the distance between the two torsional force vectors forming a force couple at the bottom of the well;
- $\pi$ is a constant;
- $\rho$ is the bulk density of the earth: and
- $U_\theta$ is the particle displacement at a right angle to $U_\phi$ and $U_r$.

The two circles represent the SH shear-wave radiation pattern in two dimensions. In three-dimensions the radiation pattern forms a toroid about the drill string axis. From expression (3), the approximate magnitude of a SH shear wave received at a particular location may be determined. With the assistance of FIG. 7, the relative magnitude of the shear wave signal may be determined by the location of the observation point along one of the two curves.

As an aid to understand the magnitude of the shear wave, one may visualize a unit scale with zero located on the z-axis between the two circles, and one located along the circles at the greatest distance or apogee. Thus, in the Figure, the maximum shear wave signal would be detected at points $+/-180$ degrees or $\pi/2$, shown by points 46 and 48 (includes corresponding points in the toroid). Conversely, the minimal shear wave signal would be detected at observation points within points 50 and 52.

Figure 8:
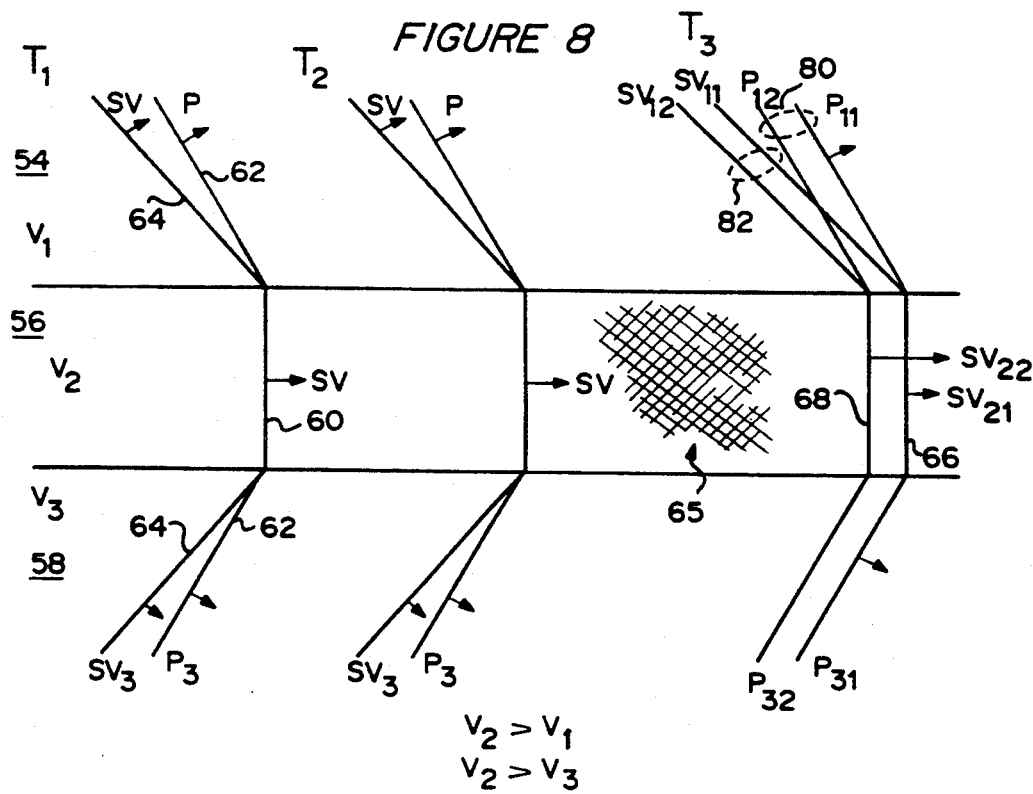
FIG. 8 is a general illustration of the far-field wave propagation characteristic within three adjacent stratigraphic units.

FIG. 8 is a general illustration of the far-field wave propagation within three adjacent stratigraphic units 54, 56 and 58. Stratigraphic units 54 and 58 immediately above and below the objective unit 56 may have propagation velocities which are less than the propagation velocity in the objective unit. The fundamental mode of wave propagation one would expect to occur if an energy source were located within the objective unit 56 would be channel waves and headwaves. That is to say a channel wave would propagate in unit 56 and headwaves would extend into the adjacent units 54 and 68.

Shown in FIG. 8 is a SV shear wave 60 propagating from left to right at several time intervals within the objective unit/formation having a propagation velocity of $V_2$. The different time intervals are indicated as $T_n$ along the top of the Figure. Also shown are secondary or refracted waves 62 and 64 in the adjacent formations 54 and 58. FIG. 8 graphically represents the sequential propagation of a shear wave as it would occur in the far field, thus the wave front may be represented by a substantially straight line.

As the shear wave 60 propagates from left to right, secondary or refracted waves are generated in the adjacent formations along the interface between the formations; the ray paths of the secondary waves entering the formation at a critical angle as controlled by Snell's Law. The secondary or refracted waves 62 and 64, which correspond to a compressional wave (P) and shear wave (SV), respectively, are detected at the surface and recorded. The refracted shear wave may or may not have the same polarization or particle motion as the shear wave generated within the objective unit, as long as the particle displacement vector may be detected at the surface. Assuming that the objective unit is a homogeneous material, no change in the particle displacement direction should occur as the signals propagate through the formation.

As the shear wave passes through the fractured zone 65, the shear wave is split into two wave modes 66 and 68. One may have a shear-wave particle-displacement parallel to the direction of the fractures, and a second may have particle displacement perpendicular or normal to the fractures. The shear-wave polarized parallel to the fractures propagates through the fracture zone at a greater velocity than does the shear-wave polarized normal to the fractures. Combination of the two shear-wave modes 66 and 68 produces a resultant particle displacement which may be rotated from the orientation of the initial shear wave entering the fracture zone. This is best illustrated by referring to FIG. 9.

Figure 9:
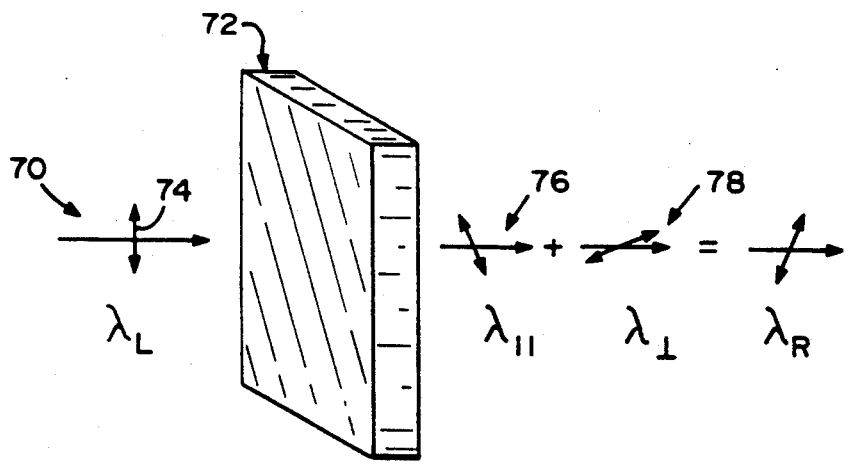
FIG. 9 illustrates the behavior of a shear wave before and after passing through a fracture zone.
Figure 10:
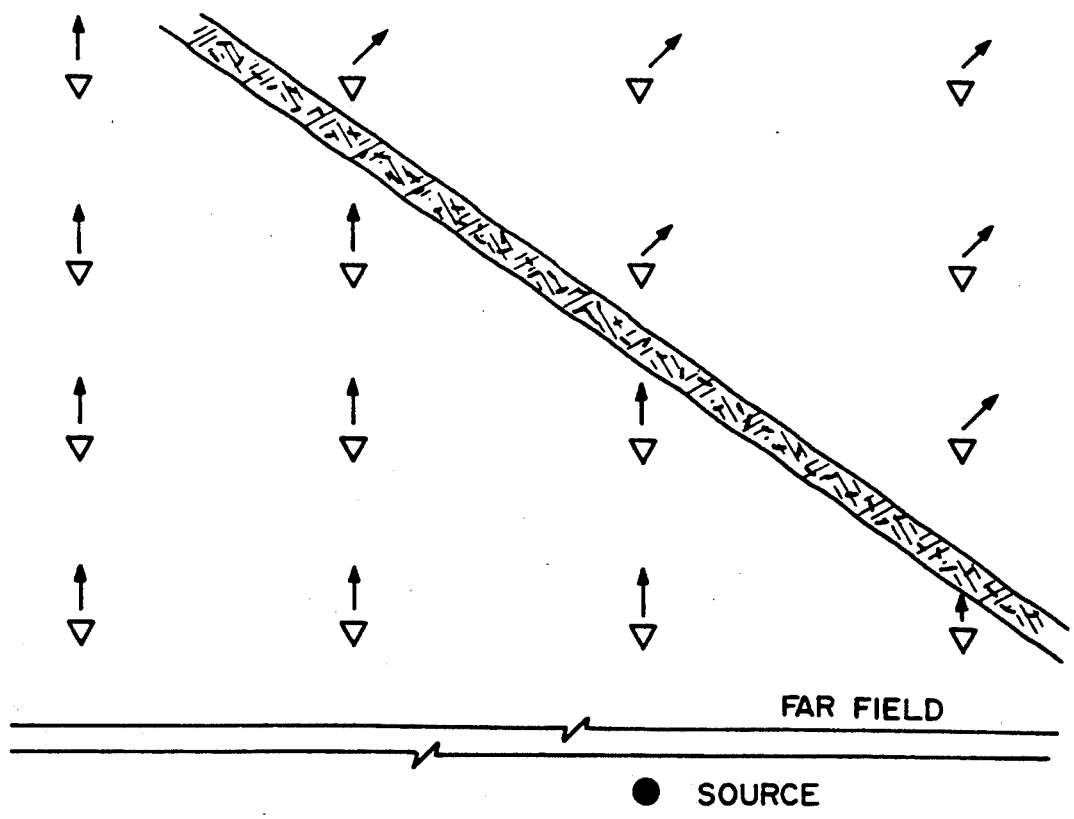
FIG. 10 is a map view of an array of sensors measuring the orientation of shear-wave displacement vectors produced by a drill bit at various offset distances from a drilling location.
Figure 11:
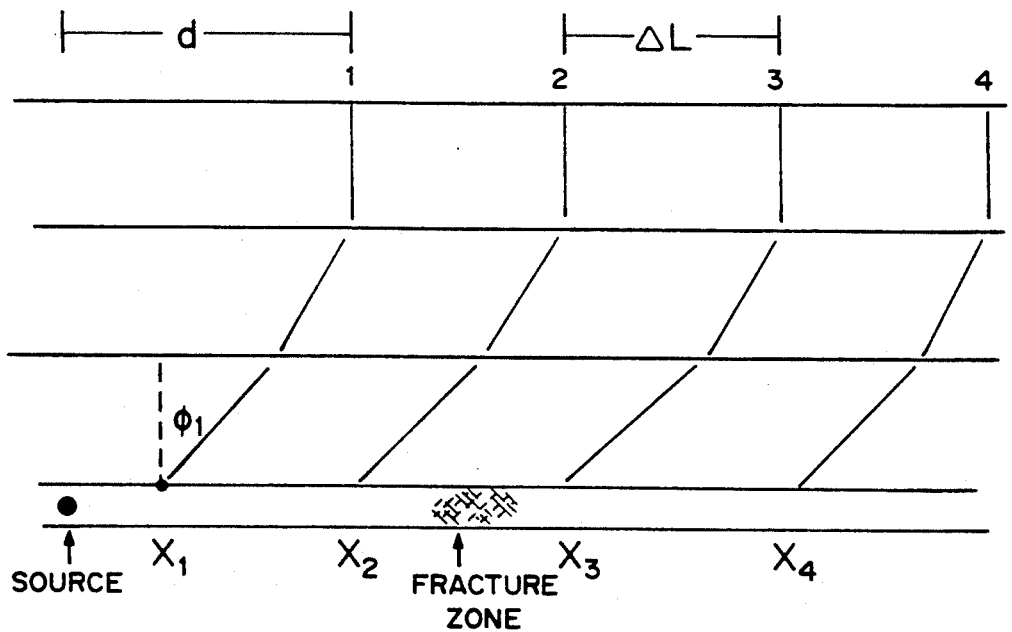
FIG. 11 is a diagram in section of ray paths associated with the propagation of shear waves from a stratigraphic unit to the surface.

FIG. 9 illustrates the behavior of a shear wave 70 before and after passing through a fracture zone 72. The initial shear wave 70 has a particle displacement in a first direction indicated by arrow 74. As shear wave 70 enters the fracture zone 72, the wave becomes polarized into two wave modes shown by arrows 76 and 78. As a result of the polarization, the wave mode parallel to the fractures propagates through the fractured zone faster than the mode polarized normal to the fractures. Thus when the signals exit the fractured zone, two separate wave modes of shear wave exist.

Corresponding secondary or refracted compressional and shear waves 80 and 82 respectively, are generated in the adjacent formations by each shear-wave mode 66 and 68 within the objective unit as shown in FIG. 8. Under the assumption that a homogeneous medium overlies the objective unit 56, the direction of particle displacement is the same for the secondary or refracted shear waves as for the shear wave generating the secondary or refracted wave.

In actual application, the different propagation velocities of the two shear-wave modes are not all that different. Any distinct separation in the arrival time of the two modes would require a fracture zone of substantial thickness. Because the width of the fracture zones in some formations may not be greater than a few tens or hundreds of feet, very little separation in arrival time of the two modes will occur. In practice, each of the secondary shear wave modes will be detected substantially simultaneously, producing a resultant shear wave vector at the sensor. As suggested earlier, it is the resultant shear wave vector which is of interest. Any rotation of a shear-wave detected at the surface suggests the presence of fractures in the subsurface. That is to say the geophysicist searches for any rotation of the shear wave resultant across the survey area. The location may be determined by well known data processing techniques.

In another embodiment of this invention, this same technique may be applied to the horizontal drilling of wells. FIG. 12 illustrates the substantially horizontal penetration of an objective unit. The radiation patterns of the seismic signals are also illustrated which are similar to those shown in FIG. 2. FIG. 13 is a diagram of the radiation patterns in the objective unit from line 12—12 in FIG. 12. As shown by the patterns, the shear waves propagate the furthest in a horizontal direction perpendicular to the axis of the bore hole. Just as in the above embodiment, the shear wave is guided in the objective unit by the underlying and overlying units, with the generation of the corresponding secondary or refracted wave modes. In the alternate embodiment, the laterally propagating shear waves illuminate fracture zone trends which may appear in the lateral far field as the drilling progresses within the objective unit. Such trends provide information which may be beneficial to the definition of a petroleum reservoir. Moreover, the detection of such fractures will assist the drillers in directing the course of the well to intersect the fractures.

My invention has been described with a certain degree of specificity. Variations will occur to those skilled in the art which may be considered to be within the scope and spirit of this invention limited only by the appended claims, wherein:

I CLAIM AS MY INVENTION:

1. A method for determining the location of fractured zones in a subsurface formation having a higher seismic velocity than overlying and underlying formations, comprising:

generating a shear wave signal within the higher velocity formation, said shear wave signal travelling through the formation as a channel wave and being refracted toward the earth's surface as a shear head wave through the interface between the higher velocity formation and the overlying lower velocity formation;

detecting said refracted shear head wave at a plurality of spaced apart locations at the earth's surface; and determining as a function of the detection location variations in the particle displacement vector of the detected shear head wave resulting from the channel wave travelling through a fractured zone in the higher velocity formation prior to being refracted as a shear head wave toward the earth's surface; and determining the location of a fracture zone in the higher velocity formation on the basis of the pattern variation detected at the earth's surface of the particle displacement vector of the shear head wave.

2. The method of claim 1 wherein the shear wave signal is generated by a drill bit as it drills a well bore.

3. The method of claim 2 wherein the drill bit is drilling a substantially horizontal well substantially parallel to the interfaces between the higher velocity formation and the overlying and underlying lower velocity formations.

* * * * *